United States Patent

[11] 3,600,057

| [72] | Inventor | Raymond J. Leffler |
| | | Rte. 1, Rockford, Tenn. 37853 |
| [21] | Appl. No. | 817,108 |
| [22] | Filed | Apr. 17, 1969 |
| [45] | Patented | Aug. 17, 1971 |

[54] SINGLE SLIDE MICROSCOPY APPARATUS
4 Claims, 3 Drawing Figs.

[52] U.S. Cl. .................................................. 350/81, 350/94
[51] Int. Cl. ................................................ G02b 7/00, G02b 21/34
[50] Field of Search ........................................ 350/92–95, 81, 90, 238 T

[56] References Cited
UNITED STATES PATENTS

| 1,996,141 | 4/1935 | Broadhurst et al. | 350/94 |
| 2,462,573 | 2/1949 | Turrettini | 350/81 UX |
| 2,508,413 | 5/1950 | Massinger | 350/92 UX |
| 1,800,209 | 4/1931 | Christopherson | 350/81 UX |
| 3,481,659 | 12/1969 | Rosenberg | 350/94 |

OTHER REFERENCES

Lab-Items Associates, P.O. Box 321, San Francisco, Calif., Pantascope, Received 3-22-67, copy in 350/81 & 92.

Primary Examiner—David Schonberg
Assistant Examiner—Toby H. Kusmer
Attorney—Anthony A. O'Brien ABSTRACT: A process of microscopy and apparatus therefor wherein a slide divided into a specimen area and a reference area is positioned on a microscope stage for visual selection of object points within the specimen area, reference marks are applied to such reference area by a marking device to identify each selected object point, and the reference marks are subsequently aligned adjacent an indicator device to readily relocate such object points for further examination.

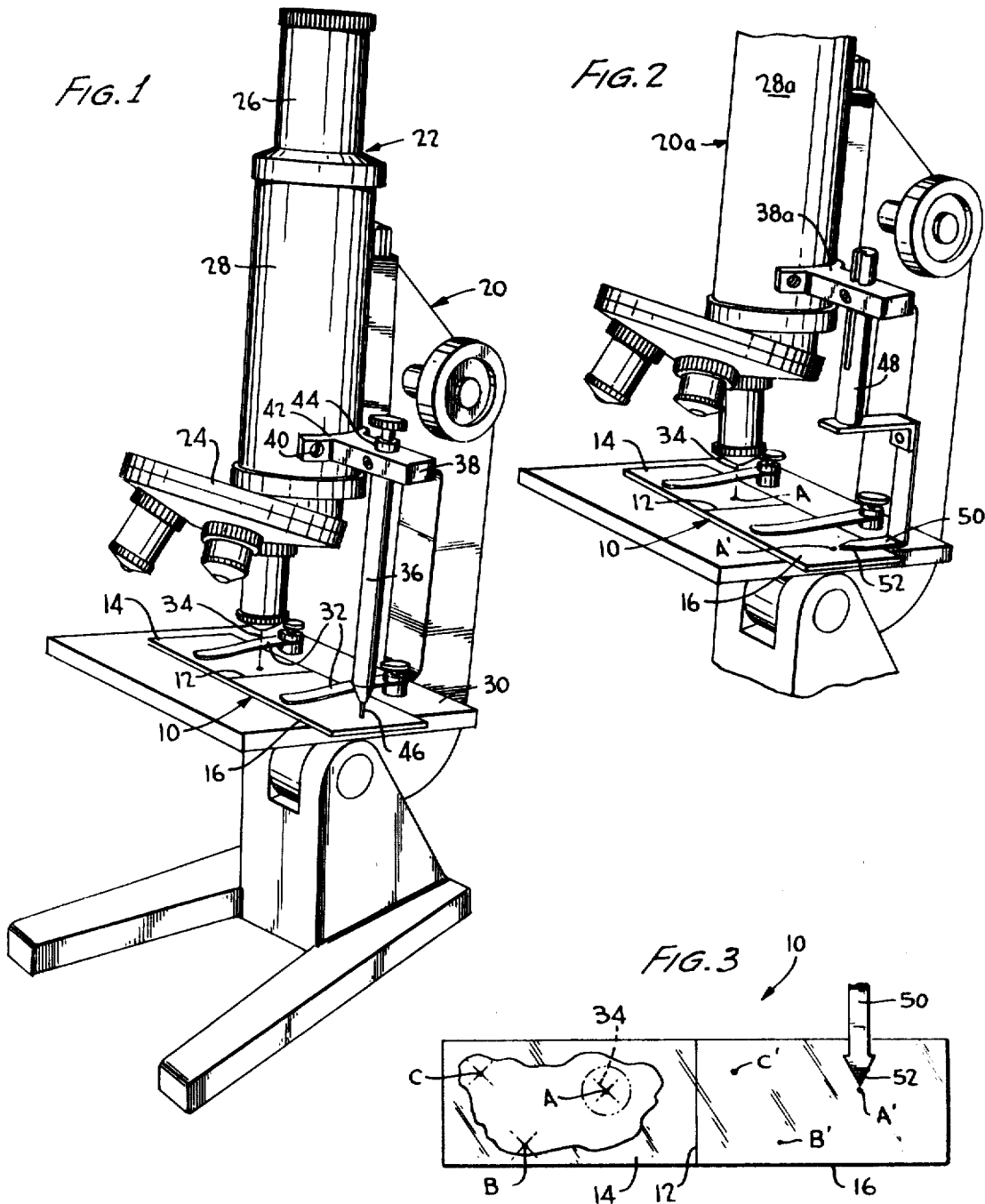

SINGLE SLIDE MICROSCOPY APPARATUS

BACKGROUND OF THE INVENTION

1. Field of the Invention

The present invention generally appertains to novel improvements in optical instruments and more particularly relates to a new and novel process of microscopy and to new and novel means for carrying out such process whereby any subsequent viewer of previously studied and identified portions or areas of subject matter on a microscope slide can easily, quickly and assuredly relocate such portions or areas without searching all of the subject matter on the slide.

2. Description of the Prior Art

Probably the best exemplary illustration of the state of this art can be found in the disclosure in U.S. Pat. No. 1,996,141, issued Apr. 2, 1935 to Broadhurst et al. Such patent discloses the desirability of marking a microscope slide so that an initially located point of interest in the subject matter on the slide can be relocated without as much searching as was required to find it originally. In accordance with such patent, this objective is realized by means of cooperating marks on the slide and reference lines on the microscope stage. Thus, the slide has three of its side edges adapted to receive markings thereon and such markings, in the restudy positioning of the slide, cooperate with cross lines on the microscope stage, such lines crossing at the optical axis of the lens system of the microscope.

Simply from the foregoing brief description of the disclosure in such patent, one can realize the limitations of the system and the drawbacks inherent in the necessity to align edge markings on a slide with the intersecting lines on the microscope stage. Such does not pinpoint an exact spot or object point of the subject matter on the slide so that it, and only it, lies in an aligned position with the optical axis of the lens system. Furthermore, such does not permit a number of points or selected portions of interest in the subject matter on the slide to be exactly for certain future relocation without any searching being necessitated. Therefore, while the patented disclosure eliminates as much searching in latter viewing as was needed originally to locate certain portions or particular areas of the subject matter or specimen on the slide, it does not eliminate all or any searching and render it possible for any desired or selected portion or area to be brought quickly, easily and exactly into viewing alignment with the optical axis of the lens system of a viewing microscope.

SUMMARY OF THE INVENTION

The primary object of the present invention is to so mark a microscope slide and to so enable such marked slide to be associated with a viewing microscope that anyone can position any previously identified and selected area or portion of the specimen on the slide in exact alignment with the optical axis of the lens system of the microscope as easily as one can mount such slide on the stage of the microscope so that relocation of previously identified areas or portions of the specimen can be accomplished in an extremely simple, expeditous and immediate manner.

Generally stated, this objective is attained by providing a slide that is transversely divided into a specimen half and a reference half with the halves being of equal and corresponding dimensions so that a mark placed at a particular point or place on the reference half will indicate a point on the specimen half that is located on such specimen half in the same place in relation to the area within the four side edges of the specimen half as the marked point on the reference half resides on such half relative to the area thereof encompassed by the side edges thereof. In other words, a mark placed in the middle of the reference half will indicatively identify the center of the specimen half.

In order to mark such slide in the first instance when the specimen is initially being searched and studied and to subsequently relocate such marked slide for review, a microscope is modified so that a marking means is disposed alongside the tube of the lens system parallel to the optical axis of such lens system of the microscope. The marking means preferably is carried by the tube. In any event, it is disposed alongside the tube and overlies the reference half of the slide with the specimen half being disposed beneath the lens system. When a particular restudiable point or place on the specimen half immediately underlies the optical axis so as to be in prime focus, the exact same counterpoint, in relation to the total area and side edges, on the reference half is marked by the marking means. Many points for restudy on the specimen half may be so indicated on the reference half and each point will have its own individual and easily recapturable characteristic location which location has its locational identifying counterpart on the reference half.

After such slide is initially studied and marked it can be reviewed by being placed on the stage of a microscope having alongside the tube thereof, and in the same relative position to the optical axis of such microscope as the marking means is in relation to the optical axis of the lens system of the marking microscope, an indicating means which can be pointed to selected marks on the reference half. When the indicating means points to a selected mark then the optical axis of the lens system is aligned with the corresponding point or place on the specimen half. Thus, with a center mark on the reference half and the indicating means pointing to it, the exact central area or point of the specimen half is in registry with the optical axis of the lens system of the microscope.

A single microscope can be used since the marking and indicating means may be of a structural nature as to comprise a common unitary arrangement alongside or on the tube for the lens system of such microscope. However, in actual usage the marking microscope will only carry a marking means since such microscope will be used by the initial technician who will mark places or points of the specimen half for review and study by physicians who will use another microscope having an indicating means associated structurally or merely functionally with the tube thereof.

Thus, in a preferred environmental usage of the instant invention, such as cytology study, the marking microscope will be used by a technician who will study the slides looking for suspicious cells in the specimen and such technician will identify located suspicious cells by placing marks on the reference half as discussed in the foregoing. The indicating microscope will be used by a physician who will quickly examine each referenced point on the specimen half without wasting any time in searching the whole specimen.

BRIEF DESCRIPTION OF THE DRAWING

FIG. 1 is a perspective view of a conventional microscope which has been modified, in accordance with the present invention, so that the tube of the lens system carries a marking member with the divided slide of the present invention shown mounted on the stage of the microscope so that the specimen half underlies the lens system while the counterpart reference half is below the marking member.

FIG. 2 is a fragmentary perspective view of a microscope which has its tube carrying an indicating means, in accordance with the present invention, and with a marked or referenced slide mounted on the stage of the microscope.

FIG. 3 is a top plan view of a marked slide which is formed and marked or referenced in accordance with the present invention and with the indicating means being fragmentarily shown in connection with the reference half and with the optical axis of the lens system of a microscope, such as shown in FIG. 2, being diagrammatically illustrated in connection with the indicated portion on the specimen half.

DESCRIPTION OF THE PREFERRED EMBODIMENT

Referring now more particularly to the accompanying drawing and initially to FIG. 3, the microscope slide 10 is divided by a transverse division line 12 into two equal halves 14 and 16, the former being the specimen half and the latter being the reference half. The specimen half has the same dimensions, width and breadth, as the reference half so that each half is equal in areal dimensions and each half has four sides including two, opposing outer side edges, an outer end edge and an inner end edge at the common division line which may be formed in any desired manner, as being etched into the slide and colored. The slide is of overall conventional arrangement, except for its separation by the transverse division line 12 into two equal halves, one of which carries the specimen or other examinable subject matter and the other of which is the reference half to be marked by the marking microscope 20 shown in FIG. 1.

With reference to FIG. 1, the microscope 20 includes a lens system 22 made up of the objective lens 24, ocular 26 at the top of the tube 28 and a condenser (not shown) below the stage 30 which has regular slide holding clips 32 on its upper surface.

The slide 10 is mounted on the stage 30 under the holding clips 32 with the specimen half 14 being positioned under the lens system 22 having an optical axis designated by the reference numeral 34. A marking member 36 is carried by an arm 38 which radiates from the tube 28 so as to horizontally overlie the stage and the reference half 16 of the slide 10 on the stage. The arm 38 is fixed to the tube by screws 40 carried by the inner saddle end 42 of the arm with such end embracing a portion of the tube into which the screws 40 are removably embedded. The arm 38 has a vertical aperture 44 in which the marking member is slidably disposed so that it can be moved down toward the slide to bring its marking tip 46 into marking contact with the reference half 16 of the slide 10. The marking member may be spring loaded so that it is normally held in a raised position with its tip up out of contact with the slide.

When the initial examination of the slide 10 is being made selected points on the specimen half 14, for example such as A, B, and C in FIG. 3, are determined by the technician to be worthy of reexamination and study. Therefore, the marker member is utilized to mark the reference half 16 with the indicator marks A', B', and C', as shown also in FIG. 3. It will be particularly noted that point A on the specimen half is at the same place on such half as its identifying counterpart mark A' is on the reference half. This is accomplished by having the marking member parallel to the optical axis so that it overlies the corresponding portion of the reference half when the portion of the specimen half is aligned with the optical axis of the lens system. Obviously, in marking and examining the slide, the slide is moved on the stage, since the optical axis and the marking member are in a fixedly located parallel relation relative to the stage and to each other with respect to the underlying slide.

After the slide is examined thoroughly and marked as desired or required, the slide can be then reexamined on an indicating microscope 20a which can be the same microscope of FIG. 1 or one similar thereto in that it will have a supporting arm 38a on the tube 28a thereof. The arm 38a supports a vertical indicator member 48 which terminates at its lower end in a horizontal pointer 50 that overlies the reference half 16 of the slide 10 on the stage of the microscope 20a of FIG. 2 and ends in an arrow tip 52 that directly points to the marks on the reference half, as shown in FIG. 3.

Thus, with regard to FIGS. 2 and 3, it can be appreciated that the indicator is pointing to the mark A' while the portion on the specimen half is in registry with the optical axis 34 of the lens system for the microscope. Similarly, if the indicator member were pointing to the marks B' or C', it can be realized, from a consideration of FIGS. 2 and 3, that the portions or spots B or C on the specimen half of the slide would be in registry with the optical axis of the lens system of the viewing microscope.

With regard to the marking member 36, as shown in FIG. 1, and the indicator member 48, as shown in FIG. 2, it can be understood that the same could be interchangeably used on just one microscope. However, in most circumstances, it is envisioned that at least two microscopes will be used in the arrangements shown in FIGS. 1 and 2. But, in this regard, it can be appreciated that the member 48 can be used alone and the marking can be effected by other means, such as a hand held marker which has its marking tip guided into marking engagement of the reference half of the slide by the tip 52 of the indicator member. On the other hand, it is conceivable that the marking tip 46 could itself be used also as the reference indicator. Thus, many possible arrangements can be envisioned including automated electronic marking and indicating means in association with special marks made on the reference half in regards to identified counterpart places or spots on the specimen half of the slide.

Inasmuch as the present invention is subject to many variations, modifications and changes in detail, it is intended that all matter contained in the foregoing description or shown in the accompanying drawing shall be interpreted as illustrative and not in a limiting sense.

What is claimed is:

1. In combination, microscope means having stage means and lens means, a single microscope slide transversely divided to form a specimen area and a blank reference area and being movably mounted upon said stage means such that an object point within said specimen area may be visually selected for further examination, marking means mounted upon said microscope means for applying a reference mark to said blank reference area at a point spaced from the selected object point of said specimen area by a preselected distance along a preselected direction, and indicating means mounted upon said microscope means at a location spaced from said lens means by said preselected distance along said preselected direction whereby selected object points within said specimen area may be readily relocated for further examination.

2. The invention as recited in claim 1 wherein said microscope means includes first and second microscopes, and wherein said marking means is mounted upon said first microscope and said indicating means is mounted upon said second microscope.

3. The invention as recited in claim 1 wherein said marking means comprises a marking pen, and wherein said indicating means comprises a mechanical pointer.

4. The invention as recited in claim 1 wherein said microscope means includes tube means, and wherein said marking means and said indicating means are mounted upon said tube means.